Nov. 28, 1950         A. WALDORF ET AL                    2,531,956
                      OPTICAL LENS SYSTEM
                      Filed Aug. 29, 1945
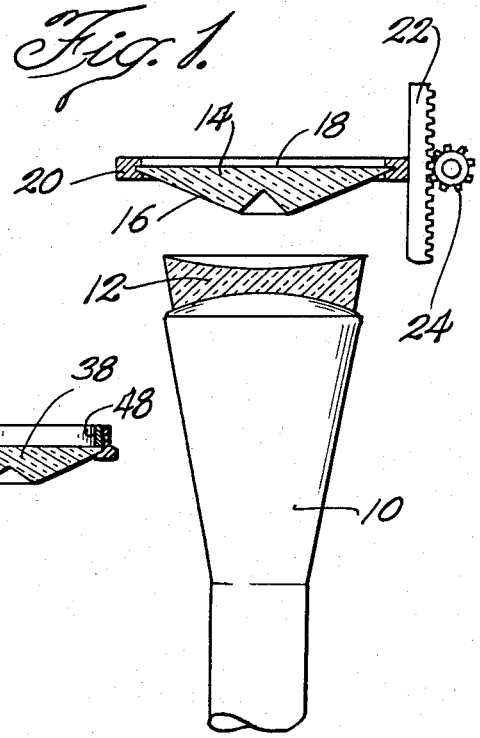
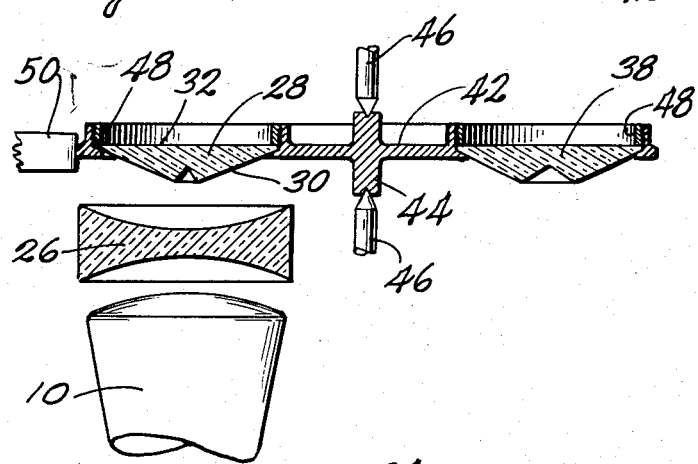
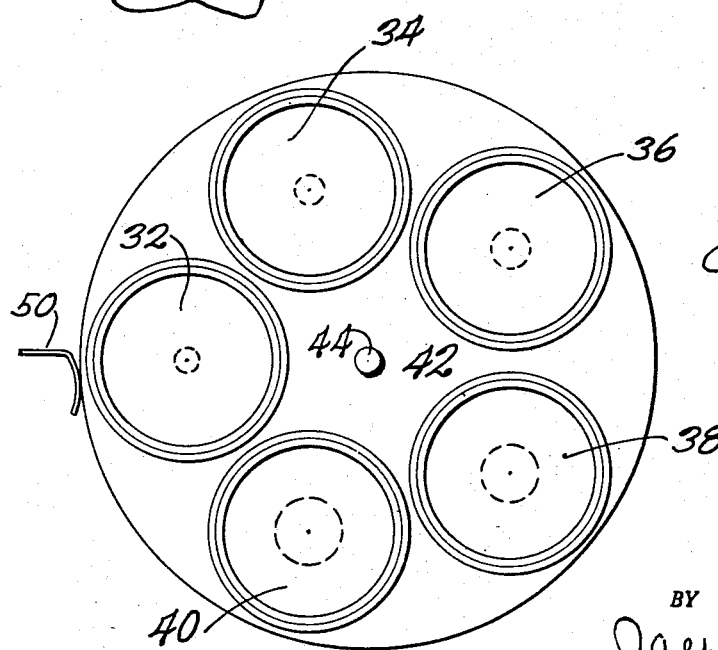
INVENTORS
ADRIAN WALDORF
WILLARD H. WADE
BY
ATTORNEY Patented Nov. 28, 1950

2,531,956

UNITED STATES PATENT OFFICE 2,531,956

OPTICAL LENS SYSTEM

Adrian Waldorf, Arlington Va., and Willard H. Wade, New York, N. Y.

Application August 29, 1945, Serial No. 613,370

7 Claims. (Cl. 88—57)

This invention relates to apparatus for the compensation of distortion encountered in the use of cathode tubes.

Cathode tubes, particularly those employed in certain forms of radar equipment, possess shortcomings that manifest themselves in distortion on the screen. The distortion is due to several influences, among which are: that inherent in the cathode tube itself; that introduced by the electrical circuits in which the tube is connected; and that resulting from a particular operating technique.

Whereas the development of cathode equipment in its radar applications has advanced materially in the last several years, little has been published along the lines of compensating or reducing distortion. This may be accounted for largely by the fact that heretofore only approximate indications have been required for the principal uses of the equipment, but as the art develops, greater accuracy becomes desirable if not essential.

Analysis of the sources of this distortion has been made particularly with respect to radar equipment of the plan-position-indicator type. The distortion inherent to the cathode tube and varying from one tube to the next may be attributed to two principal factors: the electrical eccentricity of the tube occasioned by the unequal effects of the inductances or capitances that deflect the electron beam; and the differences in physical and electrical radii, which arise from the relatively large radius of the cathode screen as compared with the relatively small radius of the beam itself. The distortion caused by the electrical circuits in which the tube is connected likewise varies from circuit to circuit calling for specific correction for a particular type and degree of distortion. The major errors introduced by the technique employed with the type of radar equipment particularly under consideration are the result of so called slant range. The effect of these slant-range phenomena noticed by the observer is a blank portion at the center of the image substantially circular in shape, the diameter of which varies in accordance with altitude and scale selected, and curvature of the image that decreases in extent progressively from the center.

Slant range may be defined as the distance along the line of sight from the observer to the object observed as distinguished from the distance between the object and a point on the earth below the observer. When airborne radar equipment is employed at, say, 30,000 feet, the cathode screen ordinarily portrays a somewhat distorted-circular blank area at its center, the area increasing with altitude. Accordingly an object one mile distant from a point below the craft appears on the screen at a distance proportional to one mile from the periphery of the blank area, instead of a distance proportional to one mile from the center of the tube. Such a representation is often difficult if not impossible to reconcile with reference maps carried by the crew. Moreover, consider a case where a square area of the earth's surface is under observation: the ratio of the line of sight to the horizontal component of the line of sight varies throughout an angle of 90° in azimuth, again departing from the nature of the maps carried for reference. Such variations as these must be compensated if accurate and ready comparisons are to be made.

Electrical eccentricity of a cathode tube arises from the impracticability of producing and locating the deflecting inductances or capacitances in such a manner as to produce a symmetrical sweep of the beam with respect to the tube axis. Thus, where a circle is scanned, it ordinarily appears somewhat elliptical on the screen.

The major portion of the distortion can be compensated optically by interposing one or more lenses between the tube screen and the eye of the observer. Such an optical system can be unitary or composite and in some cases can be at least partially integral with or contiguous to the tube itself. The optical apparatus can be designed to reduce distortion caused by any one or more of the distortion effects due to slant range, tube design and circuit characteristics. Certain portions of the optical apparatus, as for example one or more lenses, can be adjustable or interchangeable for reducing distortion under differing conditions of use such as change in altitude or distance. Interchangeability of the lenses can be accomplished by supporting a plurality of lenses for selective movement into and out of the field. A suitable lens for reducing the distortion due to slant range has been designed with a substantially W-shaped surface in section, the opposite surface of which may be plane, concave, or convex, depending upon the specific results desired.

An object of this invention is to produce an optical apparatus for correction of the type discussed with a view towards achieving greater accuracy of cathode tube images than has been possible heretofore.

A more complete understanding of the invention will follow from a detailed description of the accompanying drawings wherein:

Fig. 1 is a diagrammatic section of a distortion-reducing optical system related to a cathode tube;

Fig. 2 is a diagrammatic section of a similar system utilizing interchangeable lenses; and Fig. 3 is a plan of the apparatus shown in Fig. 2.

The cathode tube 10 of Fig. 1 has applied to its screen surface an integral or contiguous double-concave lens 12 for reducing the distortion effects inherent in the tube and/or its circuits. A second lens 14, having a substantially W-shaped surface 16 and a substantially plane (or curved where required for any specific purpose) surface 18, is mounted in a ring 20, the elevation of which with respect to the tube can be adjusted by means of a rack 22 and pinion 24 or equivalent adjusting means, the actuation of which can be effected manually or automatically to compensate for varying distortions, distances or altitudes. Lens surface 16 forms in one surface thereof a substantially conical notch with the vertex extending inwardly toward surface 18 of the lens.

The tube 10 (see Fig. 2) has adjacent thereto but spaced therefrom a double-concave lens 26, which is in turn surmounted by a spaced lens 28 having one surface 30 of substantially W-shape and another 32 that is substantially plane or curved as required by a particular installation. Similar to lens 32 but differing in optical properties are lenses 34, 36, 38 and 40 suitably held in a disk-like turret 42 having a shaft 44 rotatable in bearings 46. The lenses can be held in position in the disk by means of bezel rings 48 suitably fitted, as by employing screw threads provided by the disk. When it is desired to shift the lenses to bring a particular one into the optical field, the disk can be rotated to align the desired lens with the line of sight over the tube. A suitable brake or detent 50 may be employed to maintain the disk in any adjusted position.

In the substantially W-shape as applied to the lens surface, the lengths of the legs defining the W vary, as do the degree of curvature or sharpness of their intersections, all dependent upon the characteristics of the distortion to be overcome or reduced.

Whereas the foregoing examples serve to illustrate certain forms of the present invention, other applications suggest themselves to those skilled in the art. Accordingly such illustrations do not serve as limitations upon the invention beyond the scope of the appended claims.

The invention described herein may be manufactured and used by or for the Government of the United States of America for governmental purposes without the payment of any royalties thereon or therefor.

What is claimed is:

1. An optical system comprising first means for projecting an image along a path, a double concave lens adapted to have the image projected therethrough, and a lens disposed in said path between the first means and the observer, said lens having formed in one surface thereof a single notch only having substantially the shape of a cone, said surface apart from said notch being continuous and smooth.

2. An optical system for projecting an image and eliminating a central blank area from the image, said system comprising first means for projecting an image along a path, a double concave lens adapted to have the image projected therethrough, and a lens disposed in said path between the first means and the observer, said lens having formed in one surface thereof a single notch only having the shape of a right circular cone, said surface apart from said notch being continuous and smooth, the notch being formed with the cone vertex disposed inwardly of the lens relative to the cone base, the geometric axis of the notch being in coincidence with the optical axis of the lens.

3. An optical system comprising first means for projecting an image along a path, a double concave lens adapted to have the image projected therethrough, a lens disposed in said path between the first means and the observer, said lens having formed in one surface thereof a single notch only having substantially the shape of a cone, said surface apart from said notch being continuous and smooth, and means for adjusting said lens along the path of projection.

4. An optical system for projecting an image and eliminating a central blank area from the image, said system comprising first means for projecting an image along a path, a double concave lens adapted to have the image projected therethrough, a lens disposed in said path between the first means and the observer, said lens having formed in one surface thereof a single notch only having the shape of a right circular cone, said surface apart from said notch being continuous and smooth, the notch being formed with the cone vertex disposed inwardly of the lens relative to the cone base, the geometric axis of the notch being in coincidence with the optical axis of the lens, and means for adjusting said lens along the path of projection.

5. An optical system comprising first means for projecting an image along a path, a double concave lens adapted to have the image projected therethrough, turret means between the first and the observer, and a plurality of lenses on said turret means adapted to be individually disposed in the path of projection, each lens having formed in one surface thereof a single notch only having substantially the shape of a cone, said surface apart from said notch being continuous and smooth, said lenses having notches of different sizes.

6. An optical system comprising first means for projecting an image along a path, a double concave lens adapted to have the image projected therethrough, turret means between the first and the observer, a plurality of lenses on said turret means adapted to be individually disposed in the path of projection, each lens having formed in one surface thereof a single notch only having substantially the shape of a cone, said surface apart from said notch being continuous and smooth, said lenses having notches of different sizes, and means for axially adjusting the lens disposed in the path of projection along the path of projection.

7. An optical system comprising a cathode tube for projecting an image along a path toward a destination, a rotary turret between said tube and said destination having its periphery traversing said path, a plurality of lenses in angular sequence at the turret periphery and adapted to be individually disposed in the path of projection, each lens having formed on one surface thereof a single notch only having the shape of a right circular cone, the surface apart from said notch being continuous and smooth, the notch being formed with the cone vertex disposed inwardly of the lens relative to the cone base, the geometric axis of the notch being in coincidence with the optical axis of the lens, the notches in different lenses being of different sizes, said lenses being arranged so that the notches are in graduated sequence, and means for moving the lenses disposed in said path along said path.

ADRIAN WALDORF.
WILLARD H. WADE.

REFERENCES CITED

The following references are of record in the file of this patent:

UNITED STATES PATENTS

| Number | Name | Date |
|---|---|---|
| 494,128 | Decker | Mar. 28, 1893 |
| 1,101,686 | Dake | June 30, 1914 |
| 1,270,336 | Shigon | June 25, 1918 |
| 1,501,979 | Willson | July 22, 1924 |
| 1,843,663 | Cregier | Feb. 2, 1932 |
| 2,006,509 | Myers | July 2, 1935 |
| 2,172,775 | Schmidt-Ott et al. | Sept. 12, 1939 |
| 2,229,302 | Martin et al. | Jan. 21, 1941 |
| 2,296,943 | Okolicsanyi | Sept. 29, 1942 |
| 2,298,808 | Ramberg | Oct. 13, 1942 |
| 2,307,211 | Goldsmith | Jan. 5, 1943 |

FOREIGN PATENTS

| Number | Country | Date |
|---|---|---|
| 467,995 | Great Britain | June 28, 1937 |